US005211101A

United States Patent [19]

Letsch et al.

[11] Patent Number: 5,211,101

[45] Date of Patent: May 18, 1993

[54] PISTON WITH OVAL SHAPED LANDS

[75] Inventors: Thomas Letsch, Pluderhausen; Jorn Weipert, Lorch; Eduart Steppat, Kirchheim/Teck, all of Fed. Rep. of Germany

[73] Assignee: Mahle GmbH, Stuttgart, Fed. Rep. of Germany

[21] Appl. No.: 718,018

[22] Filed: Jun. 20, 1991

[30] Foreign Application Priority Data

Jun. 22, 1990 [DE] Fed. Rep. of Germany ....... 4019917

[51] Int. Cl.[5] .............................. F16J 1/00; F16J 1/04

[52] U.S. Cl. ........................................ 92/177; 92/219; 92/233

[58] Field of Search ................. 92/172, 177, 189, 190, 92/219, 233; 123/193 P

[56] References Cited

U.S. PATENT DOCUMENTS 2,130,923 9/1938 Jardine ................................. 92/177
2,309,555 1/1943 Venner et al. ........................ 92/233
2,544,494 3/1951 Flint ......................................... 92/233
4,716,817 1/1988 Ripberger ............................. 92/177
4,856,417 8/1989 Ishikawa ......................... 123/193 P
4,864,986 9/1989 Bethel et al. .......................... 92/177
4,957,212 9/1990 Duck et al. ...................... 123/193 P

FOREIGN PATENT DOCUMENTS 0420618 4/1991 European Pat. Off. ........ 123/193 P
1277541 4/1960 France ................................. 92/177

*Primary Examiner*—Thomas E. Denion
*Attorney, Agent, or Firm*—Collard & Roe

[57] ABSTRACT

A piston for an internal combustion engine with a separate head and skirt which are joined by the piston pin. At least one of the upper lands has a reduced diametrical clearance with the cylinder wall in an area perpendicular to the pin direction. The bottom land has a reduced diametrical clearance with the cylinder wall in the pin direction. The lands are oval shaped, the bottom land optionally a truncated oval. At least one of the upper lands can have the shape of two ovals offset by 90° like a cloverleaf.

7 Claims, 1 Drawing Sheet

PISTON WITH OVAL SHAPED LANDS

BACKGROUND OF THE INVENTION

1. Field of the Invention

The present invention relates to a piston for internal combustion engines with a piston head and a separate piston skirt joined together by the piston pin. Pistons with a separate head and skirt provide better guidance for the piston head. The piston head is provided with ring grooves and lands between the ring grooves. More particularly, it relates to such a piston where the second land is oval with the large diameter of the oval generally being aligned with the major diameter of the piston. Additionally, the fourth land is oval with the large diameter of the oval generally being aligned with the minor diameter of the piston. Alternatively, the second land can have the shape of two ovals rotated 90° apart with the large diameter of one oval generally being aligned with the major diameter and the large diameter of the second oval generally being aligned with the minor diameter.

2. The Prior Art

Circular pistons which are known distort when heated and may cause excessive friction. The prior art, according to DE-A-38 38 217, discloses guiding a one-part piston with certain areas in the major and minor diameter direction. The means disclosed for guidance cannot be utilized with pistons with a separate head and skirt. Guidance of the cylinder at individual points is described in DE-A-34 32 369. This does not involve support areas in the major diameter direction, or minor diameter direction, however.

SUMMARY OF THE INVENTION

It is an object of the present&invention to eliminate the aforementioned drawbacks of the prior art and to provide a separate piston head and skirt which is accurately guided.

It is a further object of the present invention to provide such a piston which does not generate excessive friction upon expansion.

These and other related objects are achieved according to the invention by a piston with a separate piston head and skirt. At least one land above the bottom land, e.g., second land, third land, second and third lands, is oval with the large diameter of the oval generally being aligned with the major diameter of the piston. The major diameter is generally perpendicular to the piston pin axis. Also, the bottom land, e.g., fourth land, is oval with the large diameter of the oval generally being aligned with the minor diameter of the piston. The minor diameter is generally aligned with the piston pin axis.

The piston top is therefore tightly guided in the major diameter direction by one land and in the diameter or pin direction by another land. The piston head can be guided more accurately by oval shaped lands than with a circular shape. This is due to the fact that the shape of the cylinder distorts in an area midway between the major and minor diameter in the circumferential direction. With circular pistons, this expansion causes undue friction. Advantageously, the piston is guided by a few points along the circumference rather than the entire circumference of the piston.

Alternatively, at least one land above the bottom land can have the shape of two ovals rotated 90° apart like a cloverleaf, with the large diameter of one oval generally being aligned with the major diameter and the large diameter of the second oval generally being aligned with the minor diameter.

This embodiment with two (2) offset ovals like a cloverleaf is advantageous because areas between the large diameters, e.g., areas between the major and minor diameters, in the circumferential direction can be recessed. They should be recessed back far enough so that friction caused by expansion of the piston in these areas can be avoided. The fourth land must be recessed sufficiently to allow space for the oil stripped from the cylinder wall to flow away.

BRIEF DESCRIPTION OF THE DRAWINGS

Other objects and features of the present invention will become apparent from the following detailed description considered in connection with the accompanying drawing which discloses three embodiments of the present invention. It should be understood, however, that the drawing is designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
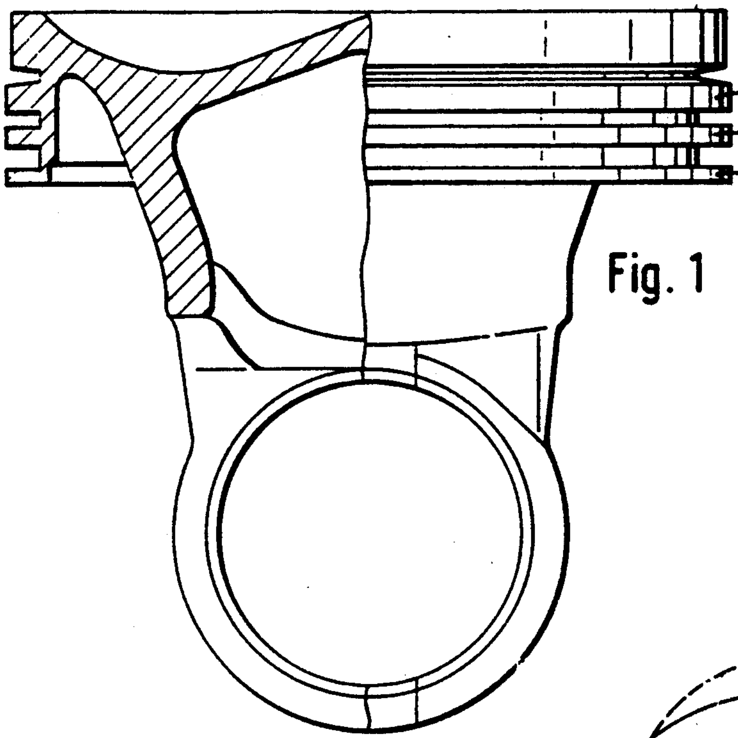
FIG. 1 is a side elevational view in partial cross-section of a piston embodying the present invention.

Referring now in detail to the drawings, and in particular, FIG. 1, there is illustrated a separate piston head made of steel having a total of three ring grooves. The piston skirt is shown in phantom line. The top two ring grooves are intended to hold compression rings and the bottom one an oil ring. The second land is designated as 1, the third land 2, and the fourth or bottom land 3.

The piston is guided by second land 1 which is oval shaped. The long axis of the oval is generally aligned with the major axis and the short axis of the oval generally aligned with the minor axis or pin axis. Bottom land 3 is also oval, but rotated 90° from the oval of second land 1. The long axis of this oval is generally aligned with the minor axis.

Figure 2:
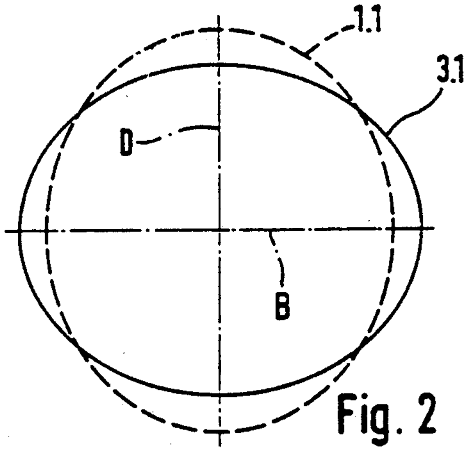
FIG. 2 is a polar representation of the piston lands.
Figure 3:
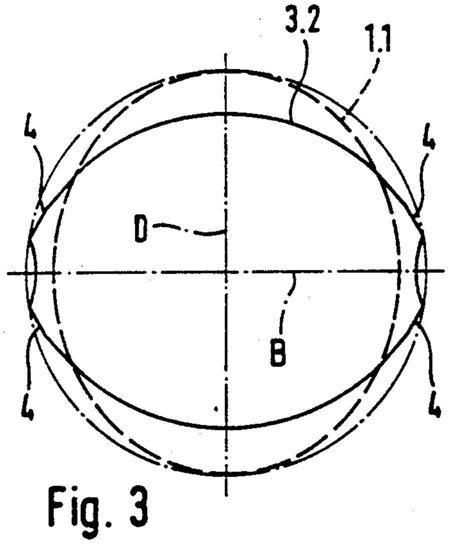
FIG. 3 is a polar representation of an alternate embodiment of the piston lands.
Figure 4:
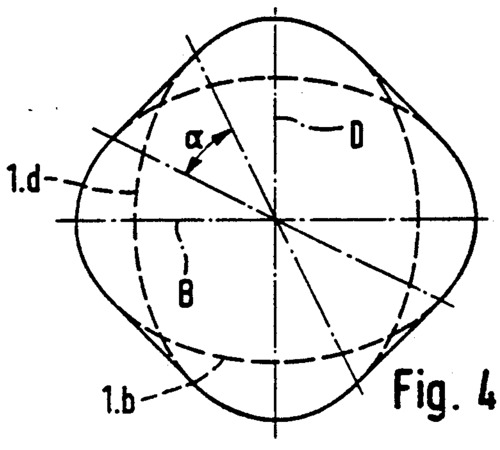
FIG. 4 is a polar representation of yet another embodiment of the piston lands

FIGS. 2, 3 and 4 illustrate polar representations of the oval shaped pistons. The major axis is designated by line D and the minor axis designated by line B. These figures are basically plan views which show the radius of the piston with regard to its angle compared to lines B and D. The oval shapes of second and fourth lands 1 and 3 are shown in FIG. 2. The oval indicated as 1.1 shows the shape of second land 1 and the oval indicated as 3.1 shows the shape of fourth land 3.

In FIG. 3, the shape of fourth land 3 is shown as contour 3.2. The difference as compared with contour 3.1 in FIG. 2 is that in addition to the oval shape, guide segments 4 also project radially out of the oval contour, in the area of the large oval diameter. At fourth land 3, the size of the small oval diameter is to be arranged in such a way that sufficient space is provided for the oil stripped from the cylinder wall to flow away.

In the embodiment according to FIG. 4, the guidance of the piston head takes place at second land 1, both in the major and minor axis directions. For this purpose, second land 1 is shaped like a cloverleaf with two ovals offset by 90°. The one oval has its large diameter in the direction D, designated in the drawing as 1.*d*. A second oval 1.*b*, offset by 90°, has a large diameter aligned with pin direction B. The tightest fit between second land 1 and the interior wall of the engine cylinder lies in the areas of the large oval diameter in each case.

The ovals 1*b* and 1*d* are set 90° apart. The area between the large diameters, i.e., generally 45° between the major and minor axes can be partially filled in. The area designed as α shows the range over which a filling can be provided, for example. In this manner, the otherwise sharp angle at 45° between the axes is smoothed out.

While only three embodiments of the present invention have been shown and described, it is to be understood that many changes and modifications may be made thereunto without departing from the spirit and scope of the invention as defined in the appended claims.

What is claimed is:

1. In an improved piston for an internal combustion engine including a head with at least one upper land and a bottom land and a separate skirt which are joined by a pin and which operate within a cylinder, the improvement comprising:

at least one of the upper lands has a reduced diametrical clearance with the cylinder wall in an area perpendicular to the pin direction; and the bottom land has a reduced diametrical clearance with the cylinder wall in the pin direction.

2. The piston according to claim 1, wherein said at least one upper land is oval shaped with the large diameter of the oval generally lying perpendicular to the pin direction.

3. The piston according to claim 2, wherein said bottom land is oval-shaped with the large diameter of the oval generally lying in the pin direction.

4. The piston according to claim 3, wherein the bottom land has the lowest clearance in an area generally perpendicular to the pin direction.

5. The piston according to claim 4, wherein the bottom land has ends at its periphery in the pin direction, the ends being truncated to form a pair of points which have the lowest clearance with the cylinder wall generally in the pin direction.

6. The piston according to claim 5, wherein the clearance of the bottom land with the cylinder wall is sufficiently large to drain oil past the bottom land.

7. A piston for an internal combustion engine which operates within a cylinder, comprising a head with at least one upper land and a bottom land;

a skirt; and a pin which joins said head to said skirt, said at least one of the upper lands having a reduced diametrical clearance with the cylinder wall in an area perpendicular to the pin direction and said bottom land having a reduced diametrical clearance with the cylinder wall in the pin direction.

* * * * *